Patented Aug. 12, 1941

2,252,400

UNITED STATES PATENT OFFICE 2,252,400

PRODUCTION OF GUANIDINE NITRATE

William H. Hill, Mount Lebanon, Pa., and Robert C. Swain, Riverside, and Joseph H. Paden, Glenbrook, Conn., assignors to American Cyanamid Company, New York, N. Y., a corporation of Maine No Drawing. Application October 29, 1940, Serial No. 363,306

7 Claims. (Cl. 260—564)

This invention relates to a method of preparing guanidine nitrate from cyanamide and/or dicyandiamide as starting materials. Objects of the invention are to provide an efficient method for the production of guanidine nitrate of high purity by a process that can be carried out on a large scale without danger from exothermic reactions and with high yields of the desired product.

In our copending application Serial No. 302,136, filed October 31, 1939, we have described a general method of preparing guanidine salts from cyanamide and dicyandiamide by heating these materials in a solvent comprising liquid ammonia in the presence of an anion capable of combining with guanidine to form a stable guanidine salt. The nitrate ion was stated to be suitable for use in preparing guanidine nitrate by this method. The present application is a continuation-in-part of the above described application, which has now issued as Patent No. 2,221,478, dated November 12, 1940, and deals with the specific application of the general principles of our discovery to the commercial manufacture of guanidine nitrate.

We have discovered that guanidine nitrate can be prepared by heating a dispersion of cyanamide or dicyandiamide in the presence of liquid ammonia if the nitrate ion or radical (NO₃) is present to combine with the guanidine when it is formed. The nitrate ion or radical may be introduced as free nitric acid or its anhydride N₂O₅ (although in the latter case water must also be present) but since both of these methods of introduction will result merely in the formation of ammonium nitrate it is preferable to employ this salt as a starting material. The nitrate ion may also be added as a salt of any other base weaker than the guanidine to be formed or in any other form in which it is capable of combining with guanidine to form a stable guanidine salt.

It is known that melamine is formed when cyanamide or dicyandiamide is heated at reaction temperatures in the presence of liquid ammonia. Under these conditions we believe that a part of the cyanamide or dicyandiamide first reacts with the ammonia to form guanidine according to the following reactions:

(1)  N≡C.NH₂+NH₃→HN=C(NH₂)₂
(2)  H₂N.C(:NH).NHC≡N+2NH₃→
                2HN=C(NH₂)₂ which guanidine combines with more of the starting material to form melamine with regeneration of the ammonia by the reactions (3)  HN=C(NH₂)₂+2N≡C.NH₂→C₃N₆H₆+NH₃
(4)  HN=C(NH₂)₂+H₂N.C(:NH).NH.C≡N→
                C₃N₆H₆+NH₃

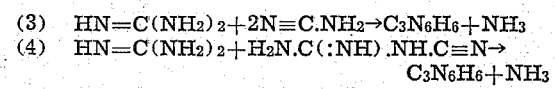

We believe that when cyanamide or dicyandiamide is heated with anhydrous ammonia in the presence of the nitrate radical the radical binds the guanidine as a stable guanidine salt in such a manner that it is no longer free to combine with further amounts of cyanamide or dicyandiamide to form melamine or other cyanamide polymerization products. Apparently guanidine in the nascent state is an extremely reactive base and will combine preferentially with even the weakest acids to form stable salts instead of combining with cyanamide or dicyandiamide. We have found that excellent yields of guanidine nitrate can be obtained by this method.

From the foregoing discussion it is evident that ammonia is an essential constituent in the process of our invention. Liquid ammonia is a solvent both for cyanamide and dicyandiamide and for ammonium nitrate, and ordinarily a solution of these ingredients in liquid ammonia will be charged into an autoclave. Upon heating, however, the ammonia evaporates as its critical temperature is about 132° C., and it is probable that the greater part of the conversion takes place in the autoclave while at least some of the ammonia is in the vapor phase. It should be understood, therefore, that in claiming the step of heating a solution of the reagent in a solvent comprising essentially liquid ammonia we of course intend to include this heating step when ammonia is present as a gas by reason of the high reaction temperatures.

A wide variation in the ratio of ammonia to the other constituents of the reaction mixture may be employed in practicing our invention. In general, we find that a mixture containing 20–75% of a mixture of ammonium nitrate and cyanamide or dicyandiamide and 25–80% of liquid ammonia can be employed, but we prefer to use a solution containing 50–70% of the ammonium nitrate-cyanamide or dicyandiamide mixture and 30–50% of liquid ammonia. With considerably less than 25% of ammonia there is difficulty in maintaining the reagents in solution in the autoclave, and in some cases there is evidence of an exothermic reaction, while too high a content of liquid ammonia results in a lowering of the speed of the reaction and in reduced yields of guanidine nitrate.

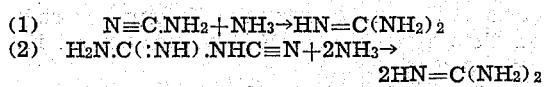

The amount of nitrate radical used in the form of ammonium nitrate or its equivalent in making up the autoclave charge is preferably the molecular equivalent of the amount of guanidine to be produced from the cyanamide or dicyandiamide or slightly less. In other words, we prefer to use about 2 moles of ammonium nitrate for each mole of dicyandiamide or one mole of ammonium nitrate for each mole of cyanamide in charging the autoclave. Considerable deviation from these ratios can be resorted to within the scope of our invention, as is illustrated in the following examples, but quantities approximating the theoretical ratio are preferable.

As has been noted above, there is no good reason for employing a nitrate other than ammonium nitrate as an ingredient in charging the autoclave, inasmuch as this salt is both relatively cheap and easily soluble in liquid ammonia. It should be understood, however, that our invention in its broader aspects is not limited to the addition of ammonium nitrate as such to the charge, as the same result can be obtained by adding equivalent amounts of nitric acid to the liquid ammonia. Small amounts of water may also be present, as an impurity in the ammonium nitrate or for other reasons, and it should be understood that the term "liquid ammonia" is not intended to exclude the presence of small amounts of water. Organic diluents may also be present in the liquid ammonia such as methyl alcohol, ethyl alcohol, or hydrocarbons such as toluol, but usually such diluents are not needed since cyanamide, dicyandiamide, and ammonium nitrate are all freely soluble in liquid ammonia itself. The chief advantage obtainable by the use of such diluents would be to reduce the autoclave pressure at unusually high operating temperatures where the autogenic pressure of the reaction may be quite high.

In applying the principles of our invention for the production of guanidine nitrate a pressure vessel should be used, for the range of reaction temperatures may be as much as 200° C. or even considerably higher. Although some reaction can be noted at temperatures as low as 80–100° C., the lowest practical operating temperature for guanidine nitrate manufacture is about 120° C. and a temperature range of 140–180° C. appears to be the optimum. In general, the speed of cyanamide or dicyandiamide conversion to guanidine nitrate doubles with each 10° C. rise in temperature, in accordance with the classical rule, and the upper temperature limit is the decomposition temperature of the guanidine nitrate product. As a practical matter, however, temperatures about 250–270° C. would hardly ever be employed, as there may be an explosion hazard at these temperatures. On the other hand it appears to be quite feasible to operate the autoclave at temperatures slightly above 214° C., the melting point of guanidine nitrate, which would permit the discharge of the product in a molten condition. It is evident, therefore, that the question of reaction temperatures is not a critical one in the process.

In practicing the process of our invention a charge consisting of the two solid ingredients is preferably dissolved or dispersed in a solvent comprising liquid ammonia, either alone or with the addition of non-aqueous diluents, and the mixture is charged into an autoclave provided with a stirrer to keep the liquid in circulation during the heating period. After heating the autoclave may be cooled and the charge collected and heated to drive off the ammonia. Another method which we have used with success consists in discharging the contents of the autoclave directly into a body of water, from which crystals of almost chemically pure guanidine nitrate can be obtained directly by cooling and crystallization. In this case the ammonia is recovered by separating the mother liquor from the crystals and stripping it with steam in an ordinary ammonia stripping column, from which the ammonia gas may be condensed in the usual manner and reused as a solvent for making up further autoclave charges.

The invention will be illustrated in greater detail by the following specific examples. It should be understood, however, that although these examples may describe certain of the more specific features of the invention they are given primarily for purposes of illustration and in its broader aspects the invention is not limited thereto.

*Example 1*

10.8 parts by weight of recrystallized dicyandiamide and 20.4 parts of ammonium nitrate were dissolved in 19.2 parts of liquid ammonia and the mixture was charged into an autoclave composed of stabilized 18–8 chrome nickel steel provided with internal heating coils and an agitator. The autoclave was heated by pumping a mixture of diphenyl and diphenyl oxide heat transfer liquid, known commercially as "Dowtherm," at 160–180° C. through the coils. The charge was heated to 160° C. and maintained at this temperature for ½ hour. The autoclave was then cooled and discharged and the ammonia was evaporated from the resulting product.

27.5 parts by weight of a product analyzing 90.4% guanidine nitrate were recovered, this amounting to a yield of 79.8%. The solid product was found to contain 5.4% of ammonium nitrate and 0.56% of unreacted dicyandiamide.

*Example 2*

10.8 parts of dicyandiamide and 20.4 parts of ammonium nitrate were dissolved in 19.2 parts of liquid ammonia and heated in an autoclave as described in Example 1, but the charge was maintained at 160° C. for 1½ hours. After removing ammonia from the autoclave product a residue amounting to 26.5 parts by weight was recovered, which contained 94.0% of guanidine nitrate, 3.3 parts of ammonium nitrate and no unconverted dicyandiamide. This amounted to a 80.2% yield of guanidine nitrate.

*Example 3*

The process of Example 2 was repeated, but the temperature of the charge in the autoclave was maintained at 160° C. for 1 hour, after which it was cooled. 29.9 parts by weight of a solid product were obtained which analyzed 92.9% guanidine nitrate, 3.2% ammonium nitrate and 0.27% dicyandiamide. This constituted a 89.1% yield of guanidine nitrate.

*Example 4*

The process of Example 3 was repeated, using the same quantities of materials, but the autoclave charge was heated to 170° C. and maintained at this temperature for ½ hour. During this time a pressure of 1650 pounds per sq. in. was developed.

Upon cooling and discharging the autoclave and evaporating the ammonia, 30.5 parts by weight of a solid product were obtained which analyzed 92.8% guanidine nitrate, 3.7% ammonium nitrate and no unconverted dicyandiamide. An overall yield of guanidine nitrate amounting to 91.1% was therefore obtained.

*Example 5*

The process of Example 4 was repeated, but the autoclave charge was maintained at 170° C. for 1½ hours and then cooled. A maximum pressure of 1800 pounds per sq. in. was developed in the autoclave during this time.

31.0 parts by weight of a solid product analyzing 93.4% guanidine nitrate, 3.4 parts ammonium nitrate and no dicyandiamide were obtained, this amounting to an overall yield of guanidine nitrate of 93%.

*Example 6*

10.8 parts by weight of dicyandiamide, 20.4 parts of ammonium nitrate and 19.2 parts of liquid ammonia were agitated together in a closed chamber until a clear solution was obtained. This solution was then pumped into the autoclave described in Example 1, heated to 180° C. and maintained at this temperature for 0.5 hour with a maximum autoclave pressure of 1950 pounds per sq. in. A 96% recovery of the solids was obtained after evaporating off the ammonia, this constituting 29.9 parts by weight of a solid product analyzing 89.9% guanidine nitrate, 4.9% ammonium nitrate and no unreacted dicyandiamide.

*Example 7*

10.8 parts of dicyandiamide and 21.0 parts of ammonium nitrate were dissolved in 12.8 parts of liquid ammonia and heated at 160° C. for 1 hour in the autoclave described in Example 1. 31.0 parts of a solid product were obtained, after evaporating off the ammonia, which analyzed 87.7% guanidine nitrate, 7.3% ammonium nitrate and no unconverted dicyandiamide. This amounted to a guanidine nitrate yield of 87.5% of the theoretical.

*Example 8*

15.25 parts of dicyandiamide, 29.7 parts of ammonium nitrate and 27.1 parts of liquid ammonia were agitated together in a closed vessel until solution occurred. The charge was then pumped into the autoclave described in Example 1, heated to 160° C. and maintained at this temperature for 1 hour after which it was cooled and the ammonia evaporated off. 43.7 parts of a product were obtained analyzing 91.2% guanidine nitrate, 5.3% ammonium nitrate and no dicyandiamide. A guanidine nitrate yield amounting to 89.7% of theory was thereby obtained.

*Example 9*

13.5 parts by weight of dicyandiamide and 26.25 parts of ammonium nitrate were dissolved in 24.0 parts by weight of liquid ammonia. The charge was heated to 170° C. and maintained at this temperature for ½ hour, after which the autoclave was cooled and discharged. The total solids recovered amounted to 39.0 parts, of which 91.0% was guanidine nitrate and 5.3% was ammonium nitrate. No unconverted dicyandiamide was found in the product.

*Example 10*

13.5 parts by weight of dicyandiamide, 25.0 parts of ammonium nitrate and 24.0 parts of liquid ammonia were stirred together until solution occurred and the charge was heated in the autoclave of Example 1 for 1 hour at 160° C. The solid product analyzed 93.2% guanidine nitrate, 3.0% ammonium nitrate and no dicyandiamide and amounted to 37.0 parts by weight, or a guanidine nitrate yield of 90.3% of theory.

*Example 11*

The process of Example 10 was repeated, using the same reaction times and temperatures but 1.28 parts by weight of water (5% based on the ammonium nitrate) was added to the autoclave charge. The solid product obtained after evaporating off the ammonia and water amounted to 37.4 parts and analyzed 91.3% guanidine nitrate, 4.9% ammonium nitrate, and 0.68% urea. This indicates that the presence of small amounts of water as impurity in the ammonium nitrate is not particularly objectionable unless a product free from urea is desired.

*Example 12*

13.5 parts by weight of dicyandiamide and 25 parts of ammonium nitrate were dissolved in 24 parts of liquid ammonia in the usual manner and heated for ½ hour at 170° C. in the autoclave. The solid product obtained after evaporating off the ammonia was found to contain 92.5% of guanidine nitrate, 3.3% of ammonium nitrate and no unconverted dicyandiamide. The guanidine nitrate yield amounted to 91.1% of theory.

*Example 13*

In order to demonstrate the influence of varying ratios of total solids to ammonia in the autoclave charge, a number of runs were made following the procedure outlined in Example 1. The results obtained are given in the following table, in which the parts are by weight, and in which "GN" means guanidine nitrate and "Dicy." means dicyandiamide.

| Dicy. | $NH_4NO_3$ | Molar ratio | $NH_3$ | Time, hours | Temp., °C. | Percent GN in soln. | Weight solid | Percent GN in solid | Total percent yield | Percent Dicy. unchanged |
|---|---|---|---|---|---|---|---|---|---|---|
| 168 | 320 | 2:1 | 450 | 1 | 140 | 8.41 | 51 | 99.5 | 53.5 | 38.0 |
| 168 | 320 | 2:1 | 450 | 3 | 140 | 9.92 | 198 | 99.3 | 91.2 | 2.7 |
| 168 | 320 | 2:1 | 900 | 3 | 140 | 9.0 | 105 | 99.04 | 67.4 | 22.6 |
| 168 | 480 | 3:1 | 450 | 1 | 160 | 6.6 | 305 | 98.54 | 95.2 | 1.8 |

In the foregoing runs the contents of the autoclave, including the ammonia, were discharged directly into warm water and in all cases clear solutions were obtained. On cooling, guanidine nitrate crystallized out and the quantities and purity of the crystals are given in the tables as "Weight solid" and "Percent GN in solid" respectively. The filtrates from the crystallization were made up to 2500 parts for analysis and the guanidine nitrate remaining in solution is given in the column headed "Percent GN in soln." The unchanged dicyandiamide was determined by analysis of the filtrates.

*Example 14*

192 parts by weight of dry cyanamide analyzing 94% $CN.NH_2$ and 366 parts of ammonium nitrate were dissolved in 450 parts of anhydrous liquid ammonia and heated for two hours at 160° C., the pressure developed being 1400 pounds per sq. in. The autoclave was then cooled and vented in the usual manner and the ammonia evaporated from the charge.

The crude product after drying contained 92.4% of guanidine nitrate and a substantially pure product was obtainable by a single recrystallization from an alcohol-benzol mixture.

What we claim is:

1. A method for the manufacture of guanidine nitrate which comprises heating, at a temperature between about 120° C. and the decomposition temperature of guanidine nitrate and under the corresponding autogenic pressure, a solution of a member of the group consisting of cyanamide and dicyandiamide in a solvent comprising essentially liquid ammonia in the presence of a nitrate ion capable of combining with guanidine to form a stable guanidine salt.

2. A method of producing guanidine nitrate which comprises heating, at temperatures between about 120° C. and the decomposition temperature of guanidine nitrate and under the corresponding autogenic pressure, a solution of a member of the group consisting of cyanamide and dicyandiamide in a solvent comprising essentially liquid ammonia in the presence of ammonium nitrate.

3. A method of producing guanidine nitrate which comprises heating, at temperatures between 80° C. and the decomposition temperature of the guanidine salt and under the corresponding autogenic pressure, a dispersion of dicyandiamide and ammonium nitrate in a solvent comprising essentially liquid ammonia.

4. A method for the manufacture of guanidine nitrate which comprises heating in a closed vessel at a temperature between about 120° C. and the decomposition temperature of guanidine nitrate a solution containing 20–75% of a mixture of ammonium nitrate and a member of the group consisting of cyanamide and dicyandiamide and 25–80% of liquid ammonia.

5. A method for the manufacture of guanidine nitrate which comprises heating in a closed vessel at a temperature between about 120° C. and the decomposition temperature of guanidine nitrate a solution containing 50–70% of a mixture of ammonium nitrate and a member of the group consisting of cyanamide and dicyandiamide and 30–50% of liquid ammonia.

6. A method of producing guanidine nitrate which comprises the steps of heating a mixture of ammonium nitrate and a member of the group consisting of cyanamide and dicyandiamide in a solvent comprising essentially liquid ammonia at temperatures between about 120° C. and the decomposition temperature of the product and under the corresponding autogenic pressure until guanidine nitrate is formed, mixing the charge with water, and crystallizing out guanidine nitrate.

7. A method according to claim 6 in which the mother liquor is separated from the crystals and the ammonia is stripped therefrom and reused in the process.

WILLIAM H. HILL.
ROBERT C. SWAIN.
JOSEPH H. PADEN.